US011550027B2

(12) United States Patent
Laghezza et al.

(10) Patent No.: US 11,550,027 B2
(45) Date of Patent: Jan. 10, 2023

(54) PREDISTORTION TECHNIQUE FOR JOINT RADAR/COMMUNICATION SYSTEMS

(71) Applicant: NXP B.V., Eindhoven (NL)

(72) Inventors: Francesco Laghezza, Eindhoven (NL); Franz Lampel, Eindhoven (NL)

(73) Assignee: NXP B.V., Eindhoven (NL)

( * ) Notice: Subject to any disclaimer, the term of this patent is extended or adjusted under 35 U.S.C. 154(b) by 176 days.

(21) Appl. No.: 16/865,824

(22) Filed: May 4, 2020

(65) Prior Publication Data

US 2021/0341567 A1 Nov. 4, 2021

(51) Int. Cl.
*G01S 7/00* (2006.01)
*G01S 7/35* (2006.01)
*G01S 13/931* (2020.01)

(52) U.S. Cl.
CPC ............... *G01S 7/006* (2013.01); *G01S 7/35* (2013.01); *G01S 7/352* (2013.01); *G01S 13/931* (2013.01); *G01S 2013/9316* (2020.01)

(58) Field of Classification Search
CPC ...... G01S 13/34; G01S 13/347; G01S 13/931; G01S 13/9316; G01S 7/023; G01S 7/4056; G01S 7/006; G01S 7/35; G01S 7/352
USPC ......................................... 342/60, 195, 128
See application file for complete search history.

(56) References Cited

U.S. PATENT DOCUMENTS

| 3,798,590 | A |   | 3/1974  | Jacobson et al. |             |
|-----------|---|---|---------|-----------------|-------------|
| 4,309,703 | A |   | 1/1982  | Blahut          |             |
| 4,333,080 | A |   | 6/1982  | Collins et al.  |             |
| 4,748,639 | A | * | 5/1988  | Feggeler        | H04B 7/005  |
|           |   |   |         |                 | 375/139     |
| 5,298,962 | A |   | 3/1994  | Nourrcier       |             |
| 5,678,554 | A | * | 10/1997 | Hossack         | G01S 7/52047|
|           |   |   |         |                 | 600/459     |
| 5,926,125 | A |   | 7/1999  | Wood            |             |

(Continued)

FOREIGN PATENT DOCUMENTS

WO    WO-2021053614 A2 *  3/2021  .......... G01S 13/325

OTHER PUBLICATIONS

Principles of Digital Dynamic-Range Compression by James M Kates published in Trends in Amplification vol. 9 No. 2 (Year: 2005).*

(Continued)

*Primary Examiner* — Erin F Heard
*Assistant Examiner* — Michael W Justice (57) ABSTRACT

A radar system is disclosed that provides joint object detection and communication capabilities. The radar system includes a communication signal generator that provides a communication signal, a pre-distortion module that applies a pre-distortion to the communication signal to provide a pre-distorted communication signal, a linear frequency modulation (LFM) signal generator that provides a LFM signal, and a mixer that mixes the pre-distorted communication signal onto the LFM signal to provide a radar signal to be transmitted by the radar system. The radar system further includes an all-pass filter that filters a plurality of de-ramped reflected images of the radar signal to provide a filtered signal. Each de-ramped reflected image includes an associated image of the pre-distorted communication signal. The all-pass filter provides a linear group delay, and a non-linear phase response. The pre-distortion is an inverse of the non-linear phase response of the all-pass filter.

20 Claims, 10 Drawing Sheets

(56) References Cited

U.S. PATENT DOCUMENTS

| | | | |
|---|---|---|---|
| 6,373,427 | B1 | 4/2002 | Hohne |
| 6,825,800 | B1* | 11/2004 | Dudley .................. G01S 7/282 |
| | | | 342/194 |
| 6,828,933 | B1* | 12/2004 | Doerry .................. G01S 7/4008 |
| | | | 342/194 |
| 6,836,240 | B1* | 12/2004 | Dubbert .................. G01S 7/282 |
| | | | 342/194 |
| 6,999,733 | B2 | 2/2006 | Hori ...................... H04B 1/707 |
| | | | 455/114.2 |
| 7,221,308 | B2 | 5/2007 | Burton et al. |
| 7,818,079 | B2* | 10/2010 | Vaananen ............... H04S 1/007 |
| | | | 700/94 |
| 8,026,762 | B2* | 9/2011 | Honcharenko ....... H03F 1/0294 |
| | | | 330/149 |
| 8,140,106 | B2* | 3/2012 | Chiba .................. H04L 27/2623 |
| | | | 455/114.1 |
| 8,290,458 | B2* | 10/2012 | Safavi .................. H04L 27/3863 |
| | | | 455/226.1 |
| 8,866,667 | B2 | 10/2014 | Vacanti |
| 9,048,796 | B2* | 6/2015 | Lozhkin ................ H03F 1/3247 |
| 9,246,523 | B1 | 1/2016 | Stopler ................ H04B 1/0458 |
| 9,494,675 | B2* | 11/2016 | McCorkle ............ G01S 13/106 |
| 9,660,605 | B2 | 5/2017 | Tinsley et al. |
| 9,762,350 | B2* | 9/2017 | Stopler ............ H04L 25/03343 |
| 9,853,365 | B2 | 12/2017 | Kumar et al. |
| 10,613,193 | B2 | 4/2020 | Kim et al. |
| 10,623,118 | B2* | 4/2020 | Lagoy ............... H04L 25/03114 |
| 11,204,410 | B2* | 12/2021 | Jansen ................... G01S 13/34 |
| 2002/0198650 | A1 | 12/2002 | Baugh et al. |
| 2004/0100210 | A1* | 5/2004 | Hori ...................... H04B 1/707 |
| | | | 315/307 |
| 2005/0156780 | A1 | 7/2005 | Bonthron et al. |
| 2007/0288235 | A1* | 12/2007 | Vaananen ............... H04S 1/007 |
| | | | 704/229 |
| 2009/0309780 | A1 | 12/2009 | Albert et al. |
| 2009/0325516 | A1* | 12/2009 | Safavi ................... H04L 27/364 |
| | | | 455/126 |
| 2010/0321107 | A1* | 12/2010 | Honcharenko ....... H03F 1/0294 |
| | | | 330/149 |
| 2011/0009153 | A1* | 1/2011 | Chiba .................. H04B 1/0475 |
| | | | 455/127.1 |
| 2011/0122014 | A1 | 5/2011 | Szajnowski |
| 2011/0187586 | A1 | 8/2011 | Cornic et al. |
| 2013/0050013 | A1 | 2/2013 | Kobayashi et al. |
| 2013/0214963 | A1 | 8/2013 | Vacanti |
| 2014/0191798 | A1* | 7/2014 | Lozhkin ................ H03F 1/3247 |
| | | | 330/149 |
| 2014/0313071 | A1* | 10/2014 | McCorkle ............ G01S 13/106 |
| | | | 342/202 |
| 2016/0124075 | A1 | 5/2016 | Vogt et al. |
| 2016/0241359 | A1* | 8/2016 | Stopler ................ H04B 1/0458 |
| 2016/0245909 | A1 | 8/2016 | Aslett et al. |
| 2017/0219689 | A1 | 8/2017 | Hung et al. |
| 2018/0003799 | A1 | 1/2018 | Yang et al. |
| 2018/0031688 | A1 | 2/2018 | Hesse et al. |
| 2018/0074168 | A1 | 3/2018 | Subburaj et al. |
| 2018/0095162 | A1 | 4/2018 | Fetterman et al. |
| 2018/0095173 | A1 | 4/2018 | Kurono |
| 2018/0113191 | A1 | 4/2018 | Villeval et al. |
| 2018/0136328 | A1 | 5/2018 | Moss |
| 2018/0306913 | A1 | 10/2018 | Bartels |
| 2019/0120933 | A1 | 4/2019 | Kurashige |
| 2019/0361113 | A1 | 11/2019 | Ray |
| 2020/0110146 | A1* | 4/2020 | Barker .................. G01S 1/0428 |
| 2020/0256948 | A1 | 8/2020 | Jansen et al. |
| 2021/0173070 | A1* | 6/2021 | Cherniak ............. G01S 7/0232 |

OTHER PUBLICATIONS

A Group Delay Compensation Power Amplifier with Auto Power Level Control for 24GHz FMCW Automobile Radar Application by Dong Chen at University of Electronic Science and Technology of China published IEEE 2018. (Year: 2018).*

Group Delay Engineering Using Cascaded All Pass Filters for Wideband Chirp Waveform Generation by Bose at IEEE (Year: 2013).*

Phase Correction of Interferograms Using Digital All-Pass Filters by Furstenberg at University of Illinois Department of Physics. (Year: 2005).*

U.S. Appl. No. 16/272,083, filed Feb. 11, 2019, entitled: Radar-Based Communication. The Examiner is referred to the copending patent prosecution of the common Applicant (no attachment).

U.S. Appl. No. 17/505,434, filed Oct. 19, 2021, entitled Radar Apparatus and Method With Content Embedded in the Radar Signal.

Barrenechea et al., FMCW Radar with Broadband Communication Capability, Proceedings of the 4th European Radar Conference, Oct. 2007, Munich Germany.

Zhang et al., Bio-Inspired RF Steganography via Linear Chirp Radar Signals, Bio-Inspired Cyber Security for Communications and Networking, IEEE Communications Magazine • Jun. 2016.

Feger et al., Optimization of Codes and Weighting Functions for Binary Phase-Coded FMCW MIMO Radars, IEEE MTT-S International Conference on Microwaves for Intelligent Mobility (ICMIM), May 2016, San Diego, CA, USA.

Lampel et al., A Performance Enhancement Technique for a Joint FMCW RadCom System, EuRAD 2019 16th European Radar Conference, Information and Communication Theory Lab, Signal Processing Systems, Oct. 2019.

Sahin et al., "A Novel Approach for Embedding Communication Symbols into Physical Radar Waveforms", Proceedings of 2017 IEEE Radar Conference, May 2017, Seattle, WA, USA.

Notice of Allowance for U.S. Appl. No. 16/272,083, 8 pgs. (dated Aug. 16, 2021).

Non-Final Rejection for U.S. Appl. No. 16/272,083, 15 pgs. (dated Apr. 29, 2021).

* cited by examiner

PREDISTORTION TECHNIQUE FOR JOINT
RADAR/COMMUNICATION SYSTEMS

FIELD OF THE DISCLOSURE

This disclosure generally relates to radar object detection systems, and more particularly relates to providing a pre-distortion technique for joint radar/communication systems in radar object detection systems.

BACKGROUND

Radar systems are finding increasing use in automotive platforms for object detection and ranging. Frequency-modulated continuous-wave (FMCW) radar is a short-range measuring radar set capable of determining distances to multiple targets, along with speed information of the targets. In particular, sawtooth modulation is commonly utilized for automotive object detection and ranging. In this regard, FMCW radars are utilized in object avoidance for stationary targets, and collision avoidance for moving targets. Vehicle-to-vehicle communication systems are also finding increasing use in automotive platforms for road safety, navigation, law enforcement, and the like. Utilizing separate radio communication systems for radar applications and vehicle-to-vehicle applications results in increased cost, and over-subscribing of valuable radio spectrum. However, the combination of communication signals with radar signals has the undesirable effect of diminishing the performance of the radar system in object detection and ranging. Further, because object detection and ranging in automotive platforms typically plays a vital role in vehicle safety, radar systems and vehicle-to-vehicle communication systems are not typically combined in automotive platforms.

SUMMARY

In a particular embodiment of the present disclosure, a radar system may provide joint object detection and communication capabilities. The radar system may include a communication signal generator, a pre-distortion module, a linear frequency modulation (LFM) signal generator, a mixer, and an all-pass filter. The communication signal generator may provide a communication signal. the pre-distortion module may apply a pre-distortion to the communication signal to provide a pre-distorted communication signal. The LFM signal generator may be configured to provide an LFM signal. The mixer may mix the pre-distorted communication signal onto the LFM signal to provide a radar signal to be transmitted by the radar system. The all-pass filter may filter a plurality of de-ramped reflected images of the radar signal to provide a filtered signal. Each de-ramped reflected image may include an associated image of the pre-distorted communication signal. The all-pass filter may provide a linear group delay, and a non-linear phase response. The pre-distortion may be an inverse of the non-linear phase response of the all-pass filter.

In a particular case, the pre-distortion module may apply the pre-distortion to the communication signal in a time domain. Here, the pre-distortion module may comprise another all-pass filter.

In another case, the pre-distortion module may apply the pre-distortion to the communication signal in a frequency domain. Here, the pre-distortion module may further apply the pre-distortion to the communication signal by multiplying a frequency domain spectrum of the communication signal with the inverse of the non-linear phase response of the all-pass filter.

In yet another case, the radar system may further include an analog-to-digital converter (ADC) and a delay correction module. The analog-to-digital converter MAY digitize the filtered signal to provide a digital representation of the filtered signal. The delay correction module configured may align all of the received communication signals in the digital representation of the filtered signal to provide an aligned digital signal. The radar system may further include an equalization module. The equalization module may de-rotate a phase of each sample of the aligned digital signal by an amount that is equal to an amount of rotation associated with the communication signal to remove the communication signal from the aligned digital signal to provide a digital radar signal. The radar system may further include a radar processing module. The radar processing module may receive the digital radar signal and detect a target associated with a first one of the plurality of de-ramped reflected images of the radar signal. The radar processing module may further determine a range to the target, and a velocity of the target.

In another case, radar system may comprise an automotive platform.

In another embodiment of the present disclosure, a method may be given for providing joint object detection and communication capabilities. The method may include generating, by a communication signal generator of a radar system, a communication signal; applying, by a pre-distortion module of the radar system, a pre-distortion to the communication signal to provide a pre-distorted communication signal; providing, by a LFM signal generator of the radar system, a LFM signal; mixing, by a mixer of the radar system, the pre-distorted communication signal onto the LFM signal to provide a radar signal to be transmitted by the radar system; and filtering, by an all-pass filter of the radar system, a plurality of de-ramped reflected images of the radar signal to provide a filtered signal. Each de-ramped reflected image may include an associated image of the pre-distorted communication signal. The all-pass filter may provide a linear group delay, and a non-linear phase response. The pre-distortion may be an inverse of the non-linear phase response of the all-pass filter.

In a particular case, in applying the pre-distortion, the method may further comprise applying the pre-distortion to the communication signal in a time domain. Here, the pre-distortion module may include another all-pass filter.

In another case, in applying the predistortion, the method may further comprise applying the pre-distortion to the communication signal in a frequency domain. Here, the method may further comprise multiplying a frequency domain spectrum of the communication signal with the inverse of the non-linear phase response of the all-pass filter.

In yet another case, the method may further comprise digitizing, by an analog-to-digital converter of the radar system, the filtered signal to provide a digital representation of the filtered signal; and aligning, by a delay correction module of the radar system, all of the received communication signals in the digital representation of the filtered signal to provide an aligned digital signal. Here, the method may further comprise de-rotating, by an equalization module of the radar system, a phase of each sample of the aligned digital signal by an amount that is equal to an amount of rotation associated with the communication signal to remove the communication signal from the aligned digital signal to provide a digital radar signal. Here further, the method may further comprise receiving, by a radar processing module of the radar system, the digital radar signal; and detecting a target associated with a first one of the plurality of de-ramped reflected images of the radar signal. Still further, in detecting the target, the method may further comprise determining a range to the target; and determining a velocity of the target.

In another embodiment of the present disclosure, a transceiver may be provided for a radar system. The radar system may provide joint object detection and communication capabilities. The transceiver may include a communication signal generator, a pre-distortion module, an LFM signal generator, a mixer, a transmitter, a receiver, and an all-pass filter. The communication signal generator may provide a communication signal. The pre-distortion module may apply a pre-distortion to the communication signal to provide a pre-distorted communication signal. The LFM signal generator may provide an LFM signal. The mixer may mix the pre-distorted communication signal onto the LFM signal to provide a radar signal. The transmitter may transmit the radar signal into an environment. The receiver may receiver a plurality of reflected images of the radar signal from the environment and de-ramp the reflected images to provide a plurality of de-ramped reflected images of the radar signal. Each reflected image may include an associated image of the pre-distorted communication signal. The all-pass filter may filter the de-ramped reflected images to provide a filtered signal. The all-pass filter may provide a linear group delay, and a non-linear phase response. The pre-distortion may be an inverse of the non-linear phase response of the all-pass filter.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
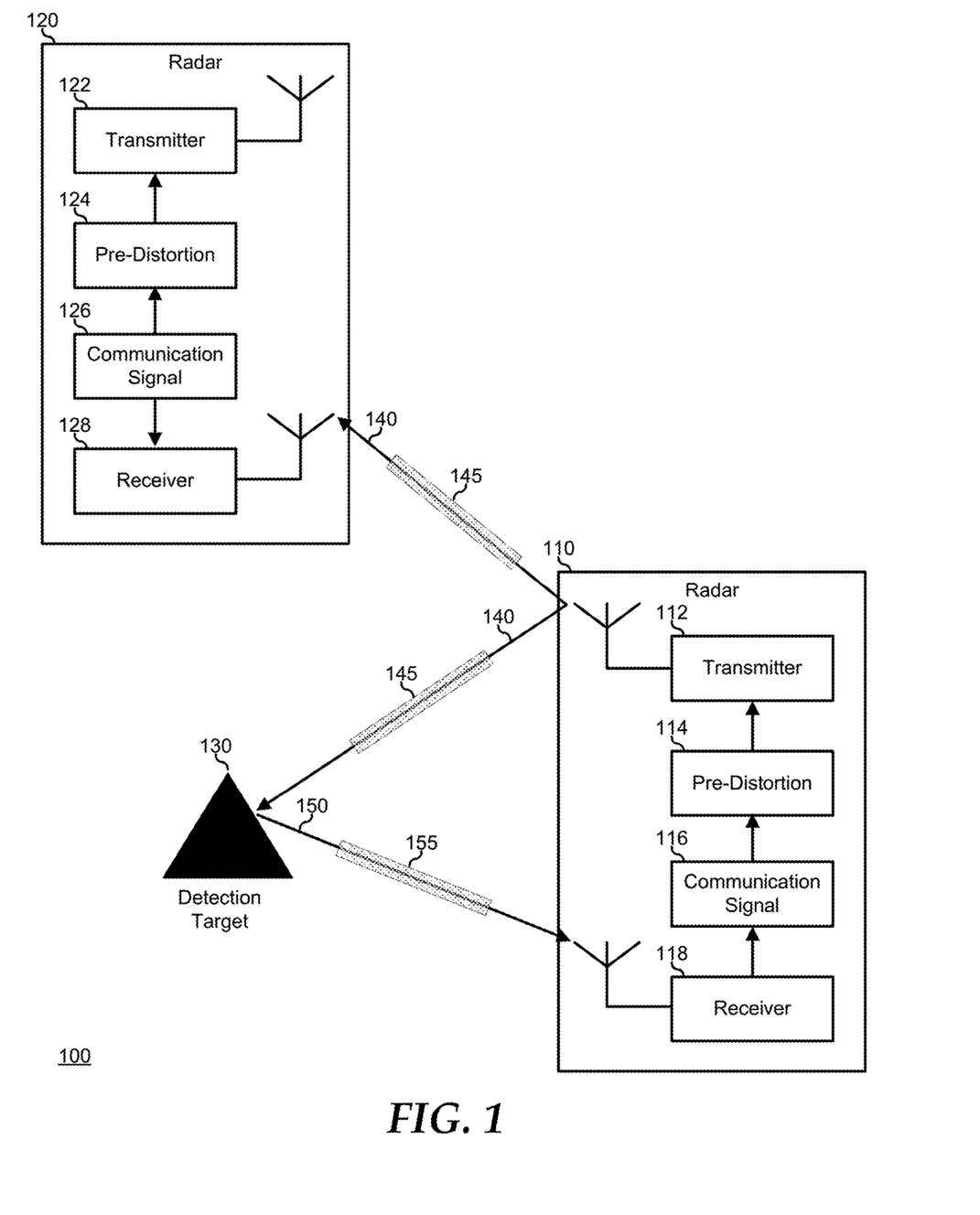
FIG. 1 is a diagram of a radar environment including radar systems in accordance with an embodiment of the present disclosure.

FIG. 1 illustrates a radar environment 100 including radars 110 and 120, and a target 130. Radars 110 and 120 may represent radar systems within automotive platforms that may be understood to be moving with respect to target 130 and with respect to each other. Radar 110 includes a transmitter 112, a pre-distortion module 114, a communication signal module 116, and a receiver 118. Radar 120 includes a transmitter 122, a pre-distortion module 124, a communication signal module 126, and a receiver 128. Radar 110 operates to provide a combined object detection and ranging capability and a communication capability. In its capability for object detection and ranging, radar 110 is configured to transmit a FMCW signal 140 from transmitter 110. FMCW signal 140 is reflected from target 130, and a reflected signal 150 is received by receiver 118. The detection and ranging of objects based upon a FMCW radar system is known in the art, and will not be further disclosed herein, except as needed to illustrate the current embodiments. In its capability for communication, radar 110 is configured to modulate a communication signal 145 onto FMCW signal 140. FMCW 140 is received by receiver 128, and communication signal 145 is extracted by radar 120. The modulation of a communication signal onto a carrier signal at a transmitting device, and the associated demodulating of the communication signals from the carrier signal at the receiving device is known in the art, and will not be further disclosed herein, except as needed to illustrate the current embodiments. It will be noted that FMCW signal 140, as reflected off of target 130, that is, reflected signal 150, will include the modulated communication signal 155, and thus receiver 118 receives original communication signal at receiver 118.

It has been understood by the inventors of the present disclosure that the combining of a radar system with a communication system, by modulating a communication signal onto a FMCW carrier, has the undesirable effect of diminishing the performance of the transmitting radar system to accurately detect and range objects. In particular, the modulation of a communication signal onto a FMCW carrier may cause an increase of a noise floor in the vicinity of the actual target range and along an entire Doppler axis. It has been further understood by the inventors of the present disclosure that the performance of the combined radar/communication system will be improved by alignment and equalization of the communication signal as described further below. It has been still further understood by the inventors of the present disclosure that the performance of the combined radar/communication system will be further improved by applying a pre-distortion to the transmitted FMCW signal as described further below. Such a pre-distortion is provided by pre-distortion module 114.

In a combined radar/communication system, a joint radar/communication signal may be provided as a transmitted complex analytic signal provided as:

$$S_{TX}(t)=\sqrt{P_{TX}}e^{(j(\Theta(t)+\varphi(t)))}\Pi(tT) \quad \text{Equation 1.}$$

Here $\Theta(t)$ is a linear frequency modulated (LFM) signal of the radar, also referred to as a chirp, and describes the instantaneous phase of the radar signal. The chirp is given as:

$$\Theta(t) = 2\pi\left(f_c t + \frac{\alpha}{2}t^w\right), \quad \text{Equation 2}$$

where $\alpha=B/T$ is the slope of the chirp, B is the RF frequency deviation, and T is the duration. The chirp can be considered as a time dependent carrier of the embedded phase modulated communication signal $\psi(t)$, that is, the chirp represents a sawtooth carrier. In a particular embodiment, the communication signal $\psi(t)$ is embedded into the radar signal by means of phase modulation.

In a particular embodiment, radar such as radar 110 applies de-ramping, also referred to a stretch processing. Here, the received signal is mixed with the transmitted signal in the receiver. The mixing translates the round-trip time of a reflected signal to a sinusoidal signal with a frequency, referred to as a beat frequency, that is proportional to the round-trip time. In a particular embodiment, the de-ramping process is applied utilizing the chirp without the embedded communication signal.

Figure 2:
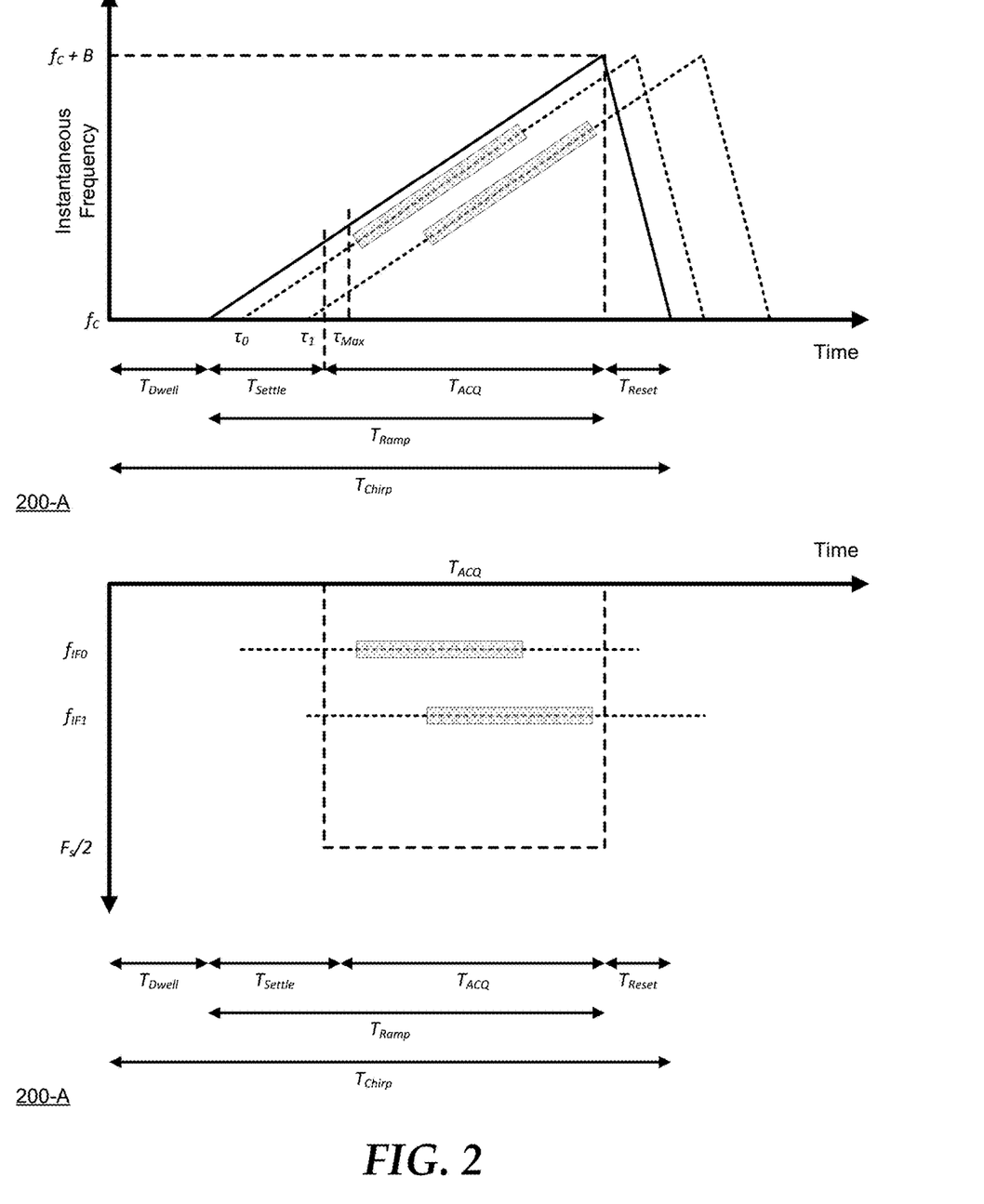
FIG. 2 shows spectrograms of a chirp of a frequency modulated continuous wave (FMCW) radar system and exemplary received reflected signals from the radar system, and of a spectrogram of the received reflected signals after being de-ramped according to an embodiment of the present disclosure.

FIG. 2 illustrates a spectrogram 200-A of a chirp and two reflected signals, and also a spectrogram 200-B of the reflected signals after the de-ramping process with the chirp. In spectrogram 200-A, the chirp is illustrated as the solid line that occurs first in time, and is, as noted above, applied without the embedded communication signal. Two reflected signals are illustrated as dotted lines and are illustrated with the embedded communication signal by the associated rectangle. Each chirp is characterized by a dwell time $T_{Dwell}$, a ramp time $T_{Ramp}$, and a reset time $T_{Reset}$. Thus the chirp time can be given as:

$$T_{Chirp}=T_{Dwell}+T_{Ramp}+T_{Reset} \quad \text{Equation 3.}$$

In spectrogram 200-B, the reflected signals are illustrated as dotted lines, and have been de-ramped. Here, the reflected signal that was received first in time is illustrated as being de-ramped to a first beat frequency $f_{IF0}$, and the reflected signal that was received second in time is illustrated as being de-ramped to a second beat frequency $f_{IF1}$. Note that both reflected signals retain the communication signal.

Each chirp is sampled within an acquisition window $T_{ACQ}$. The starting point of the acquisition window $T_{ACQ}$ is chosen in such a way that the communication signal is present during the whole acquisition window $T_{ACQ}$. That is:

$$t\in[\tau_{max};T] \quad \text{Equation 4,}$$

where $\tau_{max}$ is the maximum detectable delay time, and depends on the sampling frequency and the slope $\alpha=B/T$ of the chirp. The overall acquisition window $T_{ACQ}$ can therefore be given as:

$$T_{ACQ}=T-\tau_{max} \quad \text{Equation 5.}$$

During any given acquisition window $T_{ACQ}$, a number N of samples are recorded of the de-ramped chirp. In operation, a radar typically transmits a number M of chirps in order to perform Doppler processing, where each chirp carries an independent information sequence. Each de-ramped chirp is sampled and stored in form of a matrix such that the $m^{th}$ row contains the N samples of the $m^{th}$ chirp.

The elements of the matrix for a single target, neglecting amplitude, are given as:

$$y[m,n] = e^{\left(j\left(-2\pi\left(\frac{f_B+f_D}{f_S}\right)n+f_Dm\right)+\psi\left(\frac{n}{f_S}\tau\right)+\gamma\right)} + w(m,n), \quad \text{Equation 6}$$

where $f_B$ is the beat frequency, $f_D$ is the Doppler frequency, $\gamma$ is the residual phase comprising all constant phase terms, and $w(m,n)$ is additive white Gaussian noise. From Equation 6 it can be seen that the received signal for a single point target is the delayed communication signal modulated to a certain intermediate frequency, where the intermediate frequency is given by the range dependent beat frequency and the Doppler frequency:

$$f_{IF}=f_B+f_D \quad \text{Equation 7.}$$

Removing of the communication signal from any single target's reflected signal can be done by multiplying the particular reflected signal with the complex conjugate of the delayed communication signal. However, if multiple targets at different distances are present, the received signal contains a sum of differently delayed communication signals with different intermediate frequencies. Thus, the multiplication of multiple reflected signals with the complex conjugate communication signal can therefore not remove the communication signal. In theory, if all targets are at a same range, that is, all reflected signals have a same delay, multiplying the received signal by the complex conjugate of the delayed communication signal could be done, but in practice such is not the case.

The fundamental principle of de-ramping in FMCW radars is that a time delay translates to a beat frequency $f_B$. The relation between $f_B$ and $\tau$ is:

$$f_B=\alpha\cdot\tau \quad \text{Equation 8.}$$

The intermediated frequency $F_{IF}$ of the de-ramped signal, which is the sum of the beat frequency $f_B$ and the Doppler frequency $f_D$, is dominated by the beat frequency. This effect can be exploited to align the communication signals by shifting the de-ramped signal according to its intermediate frequency. As such, in a particular embodiment, an all-pass filter is applied to the received signal. The frequency-dependent time shifting properties of an all-pass filter are defined by its group delay $\tau_{GR}$. The group delay $\tau_{GR}$ of an all-pass filter is the negative derivative of its phase response.

In various embodiments, such as in automotive platforms, the radar transmitter and the radar receiver are co-located, and thus the receiver has access to the embedded communication signal and can use it to remove the communication signal from the received signal. In particular, radar processing takes place after all chirps have been collected, and it is therefore, possible to perform alignment of the reflected signal from multiple targets in the frequency domain by multiplying the discrete Fourier transform (DFT) of the sampled chirp with the DFT of the all-pass filter. Further, shifting back and forth in time is possible.

The group delay $\tau_{GR}$ of the all-pass filter to compensate for the round-trip time $\tau$ is given as:

$$\tau_{GR}(\omega) = -\frac{\omega_{IF}}{2\pi\alpha}, \quad \text{Equation 9}$$

and the corresponding phase response $H(\Omega)$ of the all-pass filter can be obtained from the relationship:

$$-\frac{d\angle H(j\omega)}{d\omega} = -\frac{\omega_{IF}}{2\pi\alpha}, \quad \text{Equation}$$

which results in:

$$\angle H(j\omega) = \frac{\omega^2}{4\pi\alpha} + k, \quad \text{Equation 11}$$

where k is a constant that can be set to 0 without loss of generality.

Figure 3:
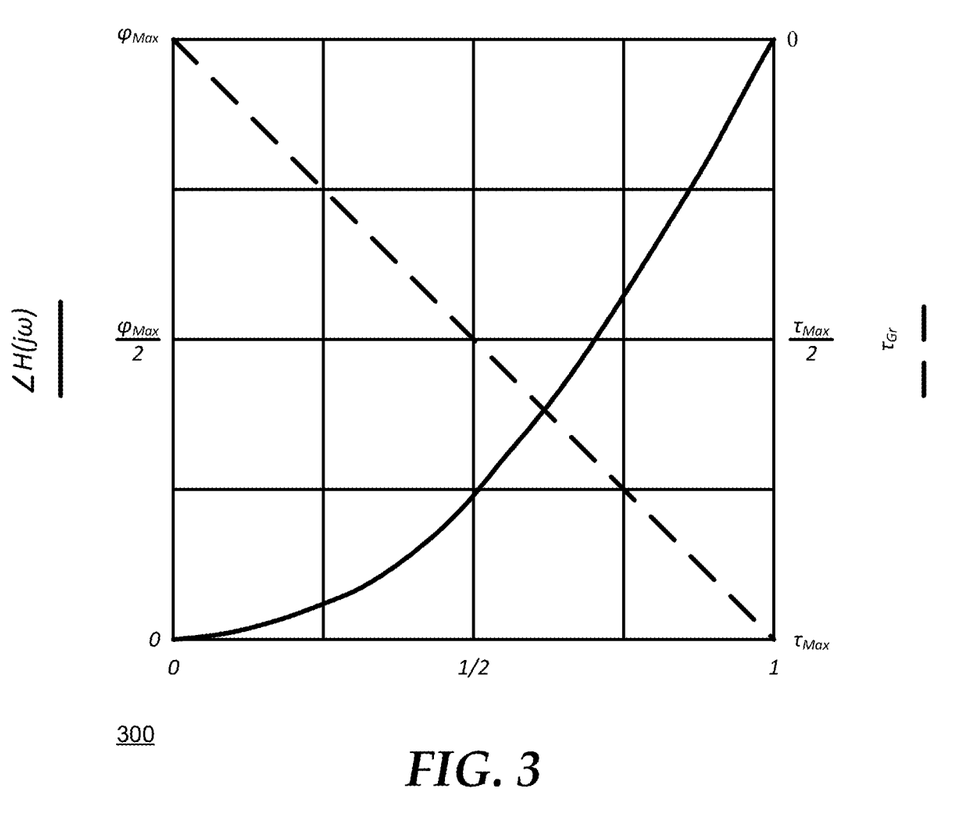
FIG. 3 is a graph of an exemplary phase response $\angle H(j\omega)$ for an all-pass filter to align a communication signal, and a corresponding group delay for the all-pass filter, according to another embodiment of the present disclosure.

FIG. 3 illustrates an example of the required phase response $\angle H(j\omega)$ for the all-pass filter to align the communication signal, shown as a solid line, and the corresponding group delay $\tau_{max}/2$, shown as a dashed line. Note that the phase response $\angle H(j\omega)$ is not linear. That it, the filtering of a received signal with such an all-pass filter will cause dispersion based upon the fact that the different frequency components are shifted by different amounts of time.

Figure 4:
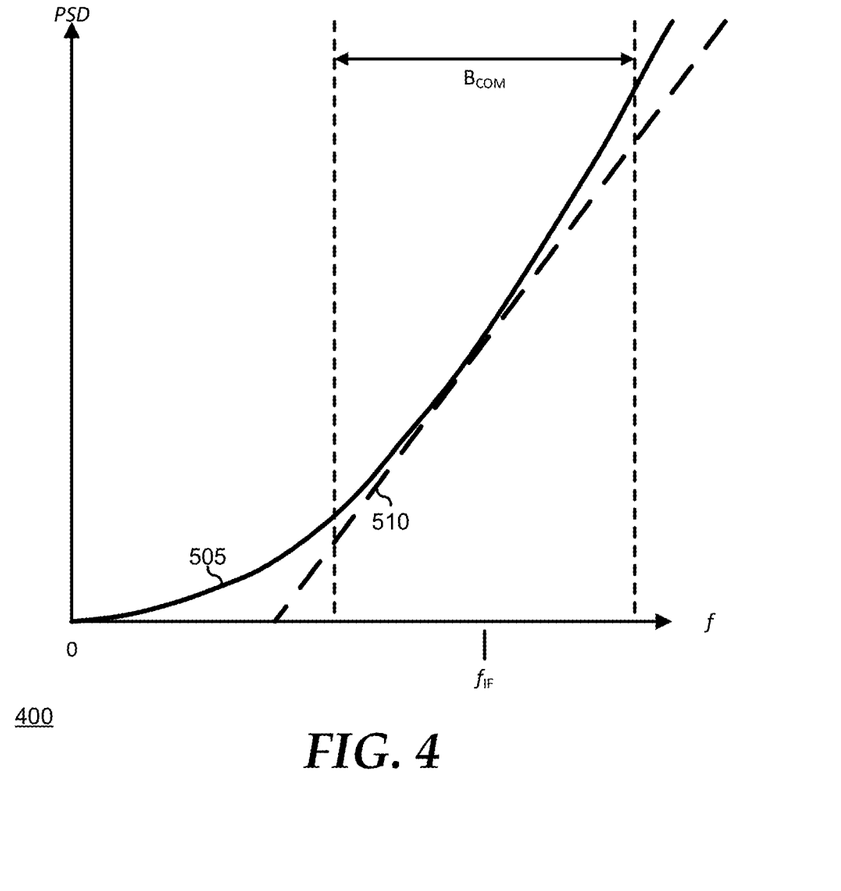
FIG. 4 is a graph showing a power spectral density (PSD) of a communication signal with bandwidth $B_{COM}$, centered at an intermediate frequency $f_{IF}$, as processed by an all-pass filter according to an embodiment of the present disclosure.

FIG. 4 illustrates this effect, showing a power spectral density (PSD) of a communication signal with bandwidth $B_{COM}$, centered at an intermediate frequency $f_{IF}$. The solid line indicates the phase response $\angle H(j\omega)$ of the filter as applied to the received signal, and the dashed line shows the linear phase that would be required in order to shift the received signal according to its intermediate frequency $f_{IF}$. Note that the deviation between the phase response $\angle H(j\omega)$ and the required linear phase response becomes larger as the difference between f and $f_{IF}$ increases. This effect becomes clearer when the phase response $\angle H(j\omega)$ is expanded as a Taylor series about point am which is given as:

$$\angle H(j\omega) = \frac{\omega_o^2}{4\pi\alpha} + \frac{\omega_0}{2\pi\alpha}(\omega - \omega_0) + \frac{1}{4\pi\alpha}(\omega - \omega_0)^2 \quad \text{Equation 12}$$

where the first term is a constant term depending on the point $\omega_0$, the second term is linear and causes the desired shift of the received signal, the last term describes the unwanted dispersion of the received signal. Note that the last term is independent of $\omega 0$, meaning that the dispersion is independent of the intermediate frequency $f_{IF}$, and that all received signals experience the same dispersion after filtering.

Figure 5:
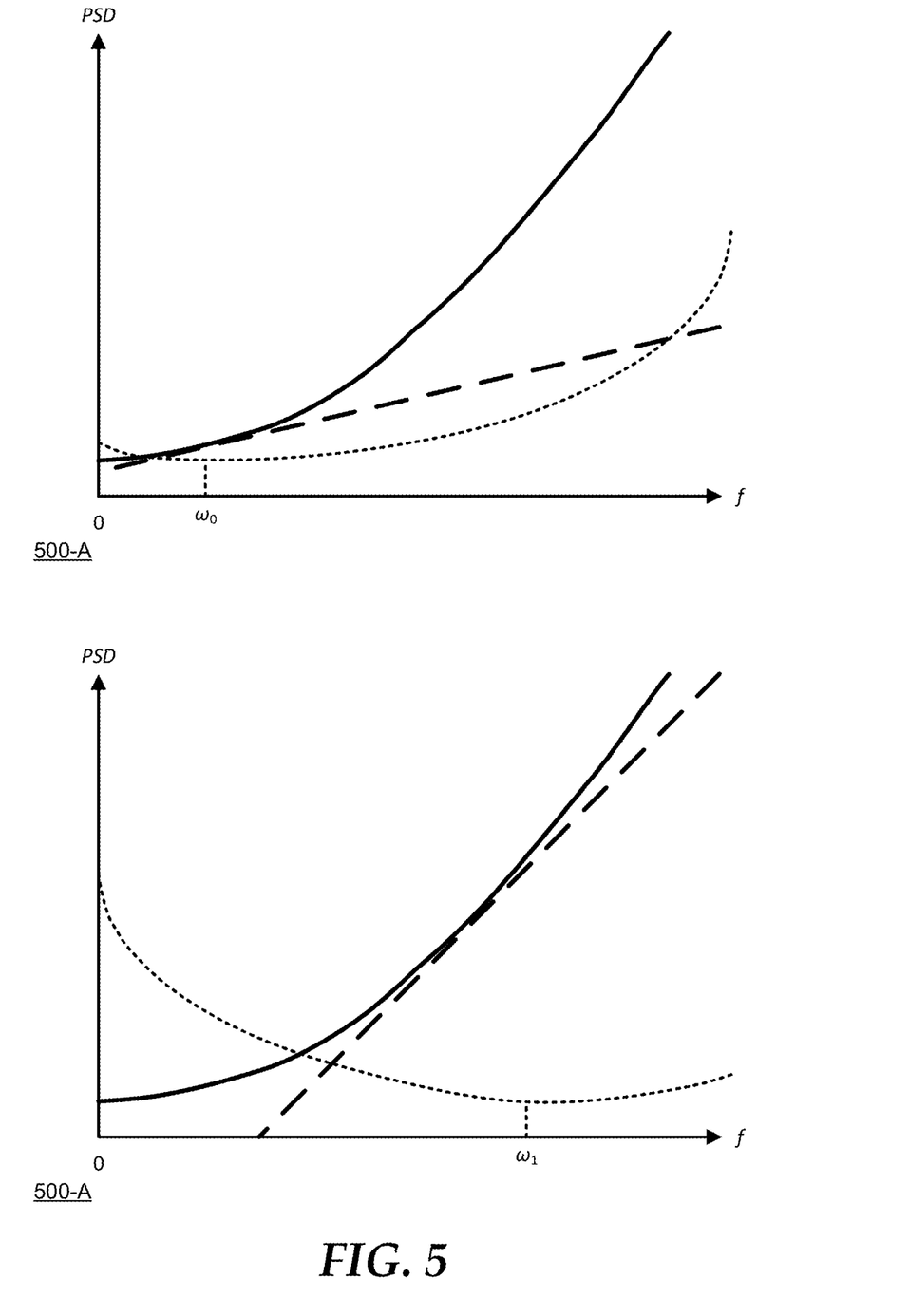
FIG. 5 shows graphs of the Taylor expansions of the phase response $\angle H(j\omega)$ of an all-pass filter about a first intermediate frequency, and about a second intermediate frequency according to an embodiment of the present disclosure.

FIG. 5 illustrates the Taylor expansions of the phase response $\angle H(j\omega)$ about a first intermediate frequency $\omega_0$ 500-A, and about a second intermediate frequency $\omega_1$ 500-B. Here, the approximation of the phase response using the first two terms of equation 12, above, are shown by the dashed lines. The dashed lines show the unwanted dispersion. Here, it is clear that the phase dispersion is in both cases the same.

Figure 6:
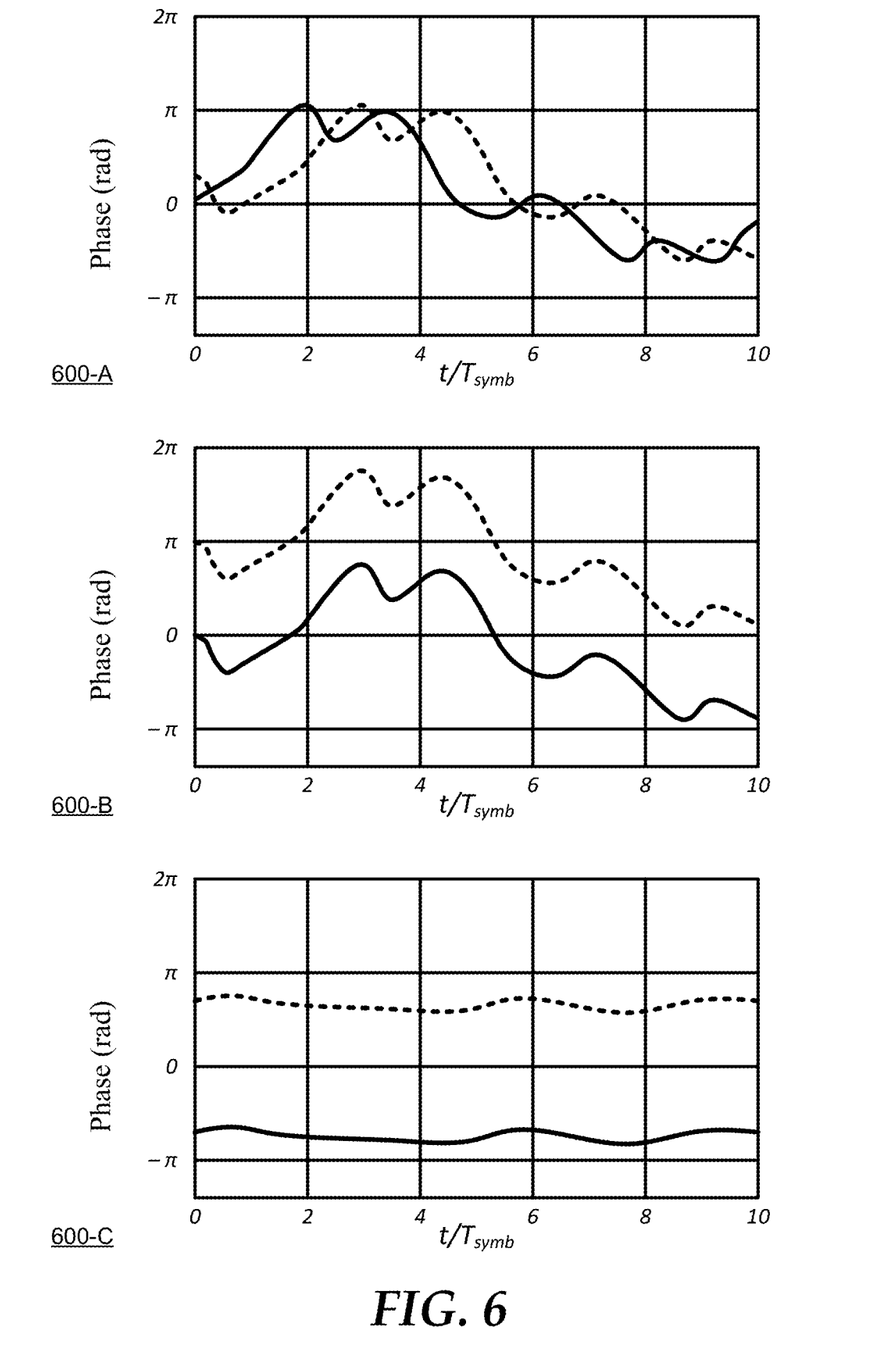
FIG. 6 shows plots of the effect of the phase dispersion on a communication signal according to an embodiment of the present disclosure.

FIG. 6 illustrates the effect of the phase dispersion on the communication signal. In plot 600-A, two differently delayed communication signals are illustrated. Here, for simplicity, only the delayed communication signals are shown, neglecting their different intermediate frequencies. The communication signal illustrated in the dashed line has a greater delay than the communication signal illustrated with the solid line, and therefore the delayed communication signal also a higher intermediate frequency. In plot 600-B, the communication signals are both shown after being aligned in time. In plot 600-C, the communication signals are equalized. It will be understood that the equalized signals should each have a constant phase, but the discrepancy is due to the dispersion.

Figure 7:
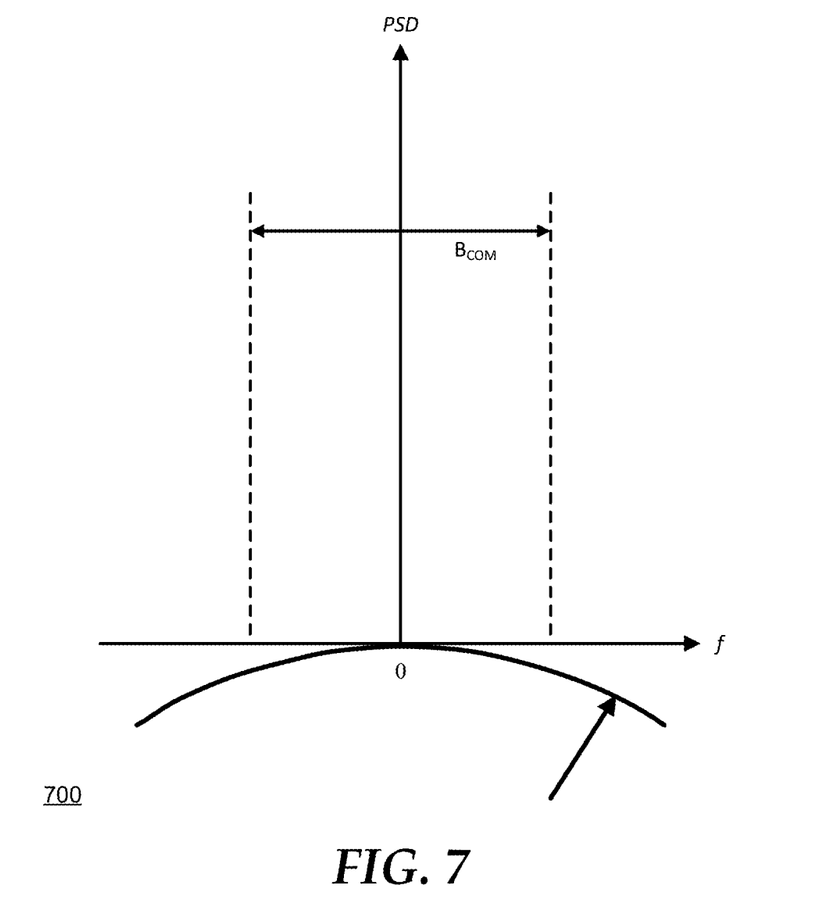
FIG. 7 illustrates the PSD of a communication signal and the phase response of a pre-distortion filter according to an embodiment of the present disclosure.

However, in a particular embodiment, the fact that the dispersion is independent of the intermediate frequency of the communication signal is used to pre-distort the transmitted signal of a radar. Here, the predistortion is chosen so as to compensate for the dispersion in the time shifting step at the receiver. As such, the communication signal is filtered with an all-pass filter with a frequency response given as:

$$H(j\omega) = e^{-j\frac{\omega^2}{4\pi\alpha}}, \quad \text{Equation 13}$$

before the communication signal is embedded in the chirp. In a first embodiment, the pre-distortion is performed in the time domain by the all-pass filter. In a second embodiment, the pre-distortion is performed in the frequency domain by multiplying the spectrum with the frequency response. FIG. 7 illustrates the PSD of the communication signal and the phase response of the pre-distortion filter.

Figure 8:
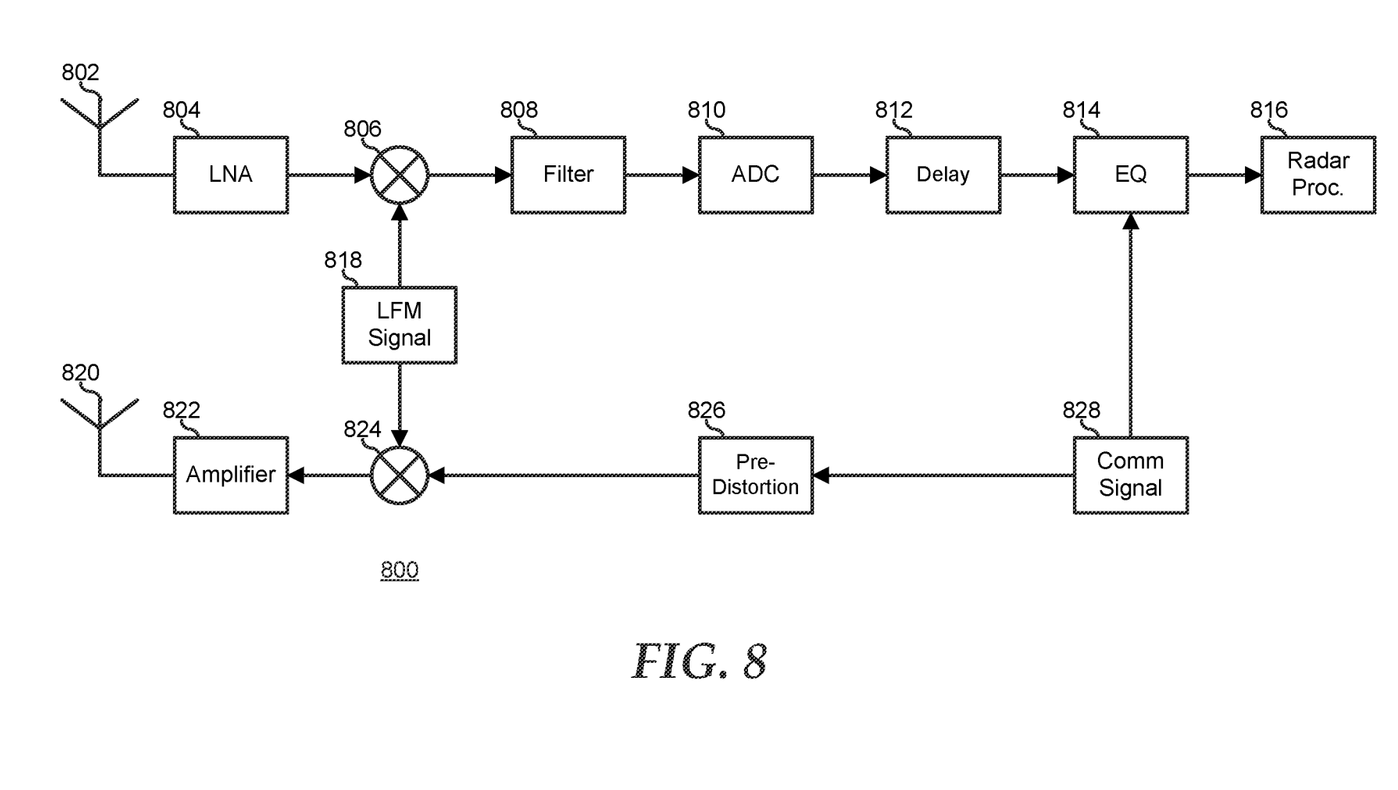
FIG. 8 is a block diagram of a transceiver of a radar system according to an embodiment of the present disclosure.

FIG. 8 illustrates a transceiver 800 according to an embodiment of the present disclosure. Transceiver 800 includes a receiver antenna 802, a low noise amplifier 804, a mixer 806, an all-pass filter 808, an analog-to-digital converter (ADC) 810, a delay correction module 812, an equalization module 814, a radar signal processing module 816, a LFM signal generator 818, a transmitter antenna 820, a transmitter final amplifier 822, a mixer 224, a pre-distortion module 826, and a communication signal generator 828. In operation, a communication signal is generated by communication signal generator 828, and the communication signal is pre-distorted by pre-distortion module 826, as described above. Here, the pre-distortion may be performed by pre-distortion module 826 in the time domain utilizing an all-pass filter or in the frequency domain by multiplying the spectrum with the frequency response, as described above. The pre-distorted communication signal is mixed by mixer 824 with a chirp generated by LFM signal generator 818, the mixed radar signal is amplified by amplifier 822, and is broadcast by transmitter antenna 820.

The transmitted radar signal may be reflected off of one or more targets. The reflected signal is received by receiver antenna 802, and amplified by LNA 804. The amplified reflected signal is mixed by mixer 804 with the chirp from LFM generator 818 to de-ramp the reflected signal as described above, to provide an intermediate frequency signal for each of the one or more targets, whose beat frequency is proportional to the delay in the reflected signal from each particular object. The de-ramped intermediate frequency signals are filtered by filter 808 and are digitized by ADC 810.

Figure 9:
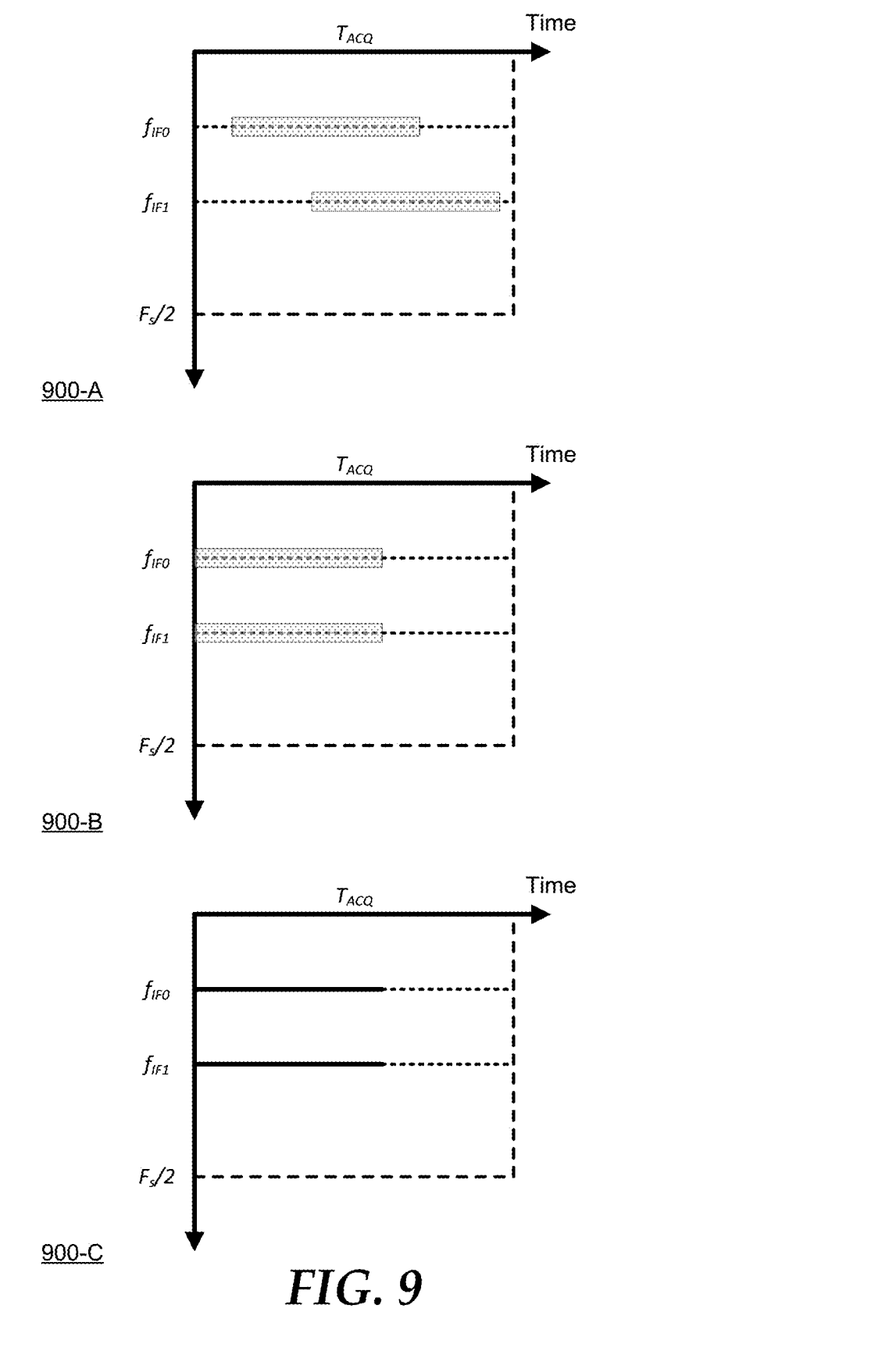
FIG. 9 shows spectrograms of received reflected signals after being de-ramped, of the de-ramped signals after being aligned, and of the aligned signals after applying pre-distortion according to an embodiment of the present disclosure.

FIG. 9 illustrates a spectrogram 900-A of de-ramped signals from two targets, as might be provided from ADC 810. The digitized signals from ADC 810 have their delays aligned by delay correction module 812. FIG. 9 further illustrates a spectrogram 900-B of the aligned signals from the two targets, as might be provided form delay correction module 812. It will be noted that the aligned signals from delay correction module 812 will still include spectral content associated with the communication signal. Equalization module 814 removes the spectral content from the aligned signals from delay correction module 812. In a particular embodiment, equalization module 814 operates to de-rotate the phase of each sample by an amount that is equal to the amount of rotation that was provided in the transmitted radar signal. FIG. 9 further illustrates a spectrogram 900-C of the equalized signals from equalization module 814. Note here that the spectral content from the communication signal is completely removed from the intermediate frequency signals, and only the beat frequency signal remains. Finally, with clean intermediate frequency signals from equalization module 814, the radar processing can be performed by radar signal processing module 816 to provide the object detection and ranging functions of the radar system associated with transceiver 800. The details of radar signal processing to provide object detection and ranging functions of a radar system are known in the art, and will not be further described herein, except as needed to illustrate the present embodiments.

Figure 10:
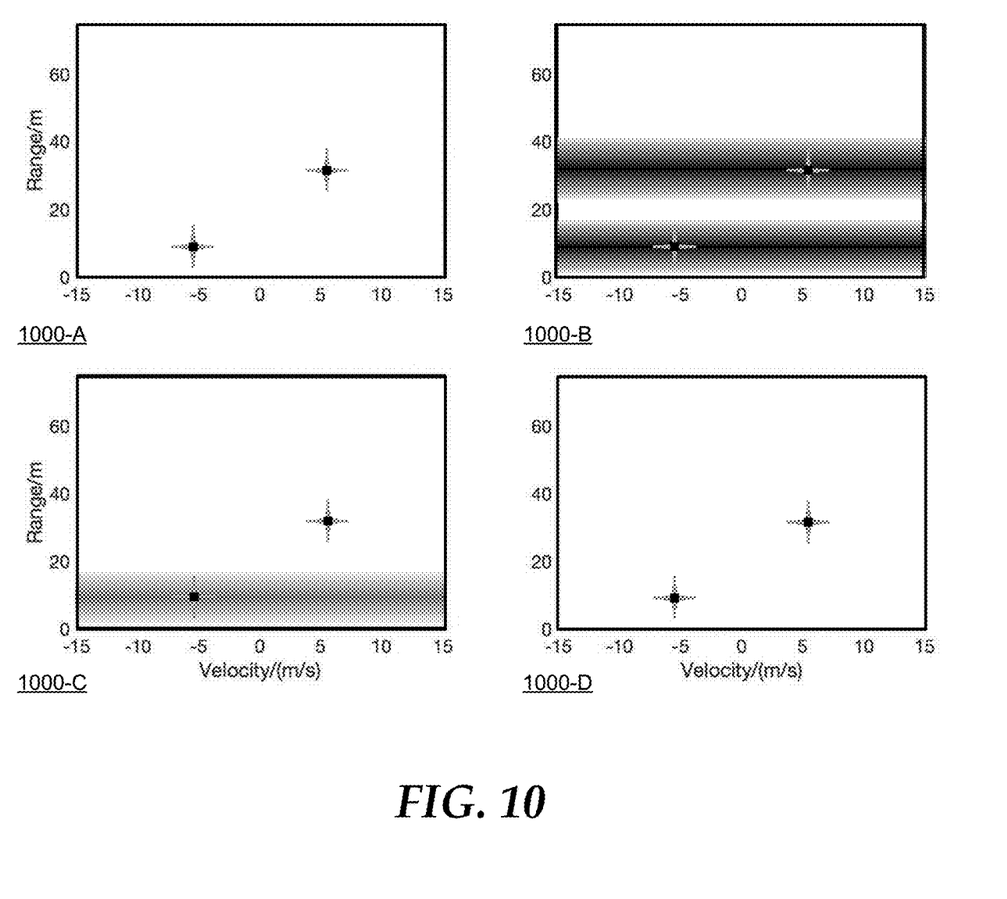
FIG. 10 illustrates Range-Doppler plots highlighting the performance of a joint radar/communication system in accordance with an embodiment of the present disclosure The use of the same reference symbols in different drawings indicates similar or identical items.

FIG. 10 illustrates Range-Doppler plots highlighting the performance of a joint radar/communication system in accordance with various embodiments of the present disclosure. Plot 1000-A illustrates two targets with different distances and velocities as might be detected by a radar system that does not provide for the embedding of communication signals, such as a radar system in accordance with the prior art. Plot 1000-B illustrates the effect of an embedded communication signal, for example embedded via Gaussian Minimum Shift Keying, for the same scenario is illustrated in plot 1000-A. Note that the embedded communication signal causes an increase of the noise floor in the vicinity of the actual targets' ranges and along the entire Doppler axis. Plot 1000-C illustrates the performance improvement that may be achieved by the alignment and equalization of the communication signal, as provided by a delay correction module and an equalization module, as described above. Note that the ability to distinguish both targets is significantly improved, but that the increased noise floor may persist to some degree for the closer target. Finally, plot 1000-D illustrates the performance improvement that may be achieved by the pre-distortion of the communication signal, as may be provided by a pre-distortion module. Note here that the performance of the radar-only system is here matched by the joint radar/communication system in accordance with the present disclosure.

Finally, in a receiver that is intended to receive the communication signal, it will be assumed that the receiver utilizes a common transceiver structure as the transmitter of the communication signal. For example, both the transmitter and the receiver may utilize the transceiver structure as shown and described in FIG. 8. Here, the receiver will synchronize to the transmitted signal, and will use the same chirp parameters to get the received signal into baseband. As such, the baseband signal is the pre-distorted communication signal from the transmitter. As such, the receiver operates to compensate for the pre-distortion by utilizing the alignment technique as describe above, and obtains the undistorted communication signal that can then be decoded.

A joint radar/communication system in accordance with the embodiments described herein provides for the embedding of a communication signal within the chirp of a FMCW radar system. In the transmitting radar, the communication signal is removed from the received reflected signal prior to subsequent radar processing to determine object locations, distances, and speed. The removal of the communication signal is performed by aligning communication signal as received in the various received reflected signals utilizing an all-pass filter. The all-pass filter is designed to have a linear group delay, but thus the phase response of the all-pass filter is non-linear. Such non-linearity causes dispersion of the communication signal in the alignment process, resulting in the imperfect removal of the communication signal, and leading to residual error in the radar processing of the received reflected signals. The residual error in the radar processing of the received reflected signals becomes more prevalent as the communication bandwidth is increased.

Therefore, the joint radar/communication system in accordance with the embodiments described herein provides a compensation scheme that exploits the correspondence between the beat frequencies of the de-ramped received reflected signals and the baseband frequency. Here, the pre-distortion technique as describe herein is provided, which, in combination with an all-pass filter, permits the complete removal of the communication signal from the received reflected signals prior to radar processing.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A radar system for providing joint object detection and communication, the radar system comprising:
 a communication signal generator configured to provide a communication signal;
 a pre-distortion module configured to apply a pre-distortion to the communication signal to provide a pre-distorted communication signal;
 a linear frequency modulation (LFM) signal generator configured to provide an LFM signal;
 a mixer, coupled to the LFM signal generator, configured to mix the pre-distorted communication signal onto the LFM signal to provide a radar signal to be transmitted by the radar system; and
 an all-pass filter configured to filter a plurality of de-ramped reflected images of the radar signal to provide a filtered signal, wherein each de-ramped reflected image includes an associated image of the pre-distorted communication signal, wherein the all-pass filter provides a linear group delay and a non-linear phase response, and wherein the pre-distortion is an inverse of the non-linear phase response of the all-pass filter.

2. The radar system of claim 1, wherein the pre-distortion module is further configured to apply the pre-distortion to the communication signal in a time domain.

3. The radar system of claim 1, wherein the pre-distortion module comprises another all-pass filter.

4. The radar system of claim 1, wherein the pre-distortion module is further configured to apply the pre-distortion to the communication signal in a frequency domain.

5. The radar system of claim 1, wherein the pre-distortion module is further configured to apply the pre-distortion to the communication signal by multiplying a frequency domain spectrum of the communication signal with the inverse of the non-linear phase response of the all-pass filter.

6. The radar system of claim 1, further comprising:
an analog-to-digital converter configured to digitize the filtered signal to provide a digital representation of the filtered signal.

7. The radar system of claim 1, wherein the radar system comprises an automotive platform.

8. A method for providing joint object detection and communication, the method comprising:
generating, by a communication signal generator of a radar system, a communication signal;
applying, by a pre-distortion module of the radar system, a pre-distortion to the communication signal to provide a pre-distorted communication signal;
providing, by a linear frequency modulation (LFM) signal generator of the radar system, an LFM signal;
mixing, by a mixer of the radar system coupled to the LFM signal generator, the pre-distorted communication signal onto the LFM signal to provide a radar signal to be transmitted by the radar system; and
filtering, by an all-pass filter of the radar system, a plurality of de-ramped reflected images of the radar signal to provide a filtered signal, wherein each de-ramped reflected image includes an associated image of the pre-distorted communication signal, wherein the all-pass filter provides a linear group delay and a non-linear phase response, and wherein the pre-distortion is an inverse of the non-linear phase response of the all-pass filter.

9. The method of claim 8, wherein in applying the pre-distortion, the method further comprises:
applying the pre-distortion to the communication signal in a time domain.

10. The method of claim 8, wherein the pre-distortion module comprises another all-pass filter.

11. The method of claim 8, wherein in applying the pre-distortion, the method further comprises:
applying the pre-distortion to the communication signal in a frequency domain.

12. The method of claim 8, wherein in applying the pre-distortion, the method further comprises:
multiplying a frequency domain spectrum of the communication signal with the inverse of the non-linear phase response of the all-pass filter.

13. The method of claim 8, further comprising:
digitizing, by an analog-to-digital converter of the radar system, the filtered signal to provide a digital representation of the filtered signal.

14. A transceiver for a radar system that provides joint object detection and communication, the transceiver comprising:
a communication signal generator configured to provide a communication signal;
a pre-distortion module configured to apply a pre-distortion to the communication signal to provide a pre-distorted communication signal;
a linear frequency modulation (LFM) signal generator configured to provide an LFM signal;
a mixer, coupled to the LFM signal generator, configured to mix the pre-distorted communication signal onto the LFM signal to provide a radar signal;
a transmitter configured to transmit the radar signal into an environment;
a receiver configured to receiver a plurality of reflected images of the radar signal from the environment and to de-ramp the reflected images to provide a plurality of de-ramped reflected images of the radar signal, wherein each reflected image includes an associated image of the pre-distorted communication signal; and
an all-pass filter configured to filter the de-ramped reflected images to provide a filtered signal, wherein the all-pass filter provides a linear group delay and a non-linear phase response, and wherein the pre-distortion is an inverse of the non-linear phase response of the all-pass filter.

15. The transceiver of claim 14, wherein the pre-distortion module is further configured to apply the pre-distortion to the communication signal in a time domain.

16. The transceiver of claim 14, wherein the pre-distortion module comprises another all-pass filter.

17. The transceiver of claim 14, wherein the pre-distortion module is further configured to apply the pre-distortion to the communication signal in a frequency domain.

18. The transceiver of claim 14, wherein the pre-distortion module is further configured to apply the pre-distortion to the communication signal by multiplying a frequency domain spectrum of the communication signal with the inverse of the non-linear phase response of the all-pass filter.

19. The transceiver of claim 14, further comprising:
an analog-to-digital converter configured to digitize the filtered signal to provide a digital representation of the filtered signal.

20. The transceiver of claim 14, wherein the radar system comprises an automotive platform.

\* \* \* \* \*